United States Patent
Lai et al.

(10) Patent No.: US 12,170,938 B1
(45) Date of Patent: Dec. 17, 2024

(54) SMART APPLESS WIFI HOTSPOT SSID DATA TRANSMISSION

(71) Applicants: Joseph Lai, Rancho Palos Verdes, CA (US); Paul Janson, Porter Ranch, CA (US)

(72) Inventors: Joseph Lai, Rancho Palos Verdes, CA (US); Paul Janson, Porter Ranch, CA (US)

( * ) Notice: Subject to any disclaimer, the term of this patent is extended or adjusted under 35 U.S.C. 154(b) by 0 days.

(21) Appl. No.: 18/739,357

(22) Filed: Jun. 11, 2024

(51) Int. Cl.
*H04W 4/38* (2018.01)
*H04W 4/14* (2009.01)
*H04W 84/12* (2009.01)

(52) U.S. Cl.
CPC ............... *H04W 4/38* (2018.02); *H04W 4/14* (2013.01); *H04W 84/12* (2013.01)

(58) Field of Classification Search
CPC .............................. H04W 12/08; H04W 36/08
USPC .................................. 455/522; 370/329, 338
See application file for complete search history.

(56) References Cited

U.S. PATENT DOCUMENTS

| | | | | |
|---|---|---|---|---|
| 9,491,623 | B2 * | 11/2016 | Filippi | H04L 63/20 |
| 10,721,208 | B2 * | 7/2020 | Liu | H04L 67/10 |
| 2016/0323689 | A1 * | 11/2016 | Goluboff | H04L 63/0823 |
| 2022/0070762 | A1 * | 3/2022 | Nuvvula | H04W 48/14 |
| 2022/0131866 | A1 * | 4/2022 | Liu | H04L 63/0227 |
| 2024/0276219 | A1 * | 8/2024 | Reeves | H04L 9/0866 |

* cited by examiner

*Primary Examiner* — Kiet M Doan

(57) ABSTRACT

Unlike conventional, traditional, old fashion wireless data acquisition, transmission and receiving devices/methods/ASIC (Application Specific Integrated Circuit) chips, this new present invention delivers fast, easy, accurate, no-nonsense, non-obsolescence, reliable, secure, low-power consumption, longer distance and lowest-cost solutions to totally, absolutely revolutionize how wireless data communication (WiFi) has been done before for simple, small, short data and/or messages and/or Internet of Things (IoT) sensors without connecting to already congested internet, and/or servers, no needs of designing, writing, debugging, testing, uploading, paying, downloading, maintaining, installing and running apps for modern day smartphones/tablets/computers users/applications work with all different operating systems and compatible to all their previous, current and future software versions.

15 Claims, 14 Drawing Sheets

SMART APPLESS WIFI HOTSPOT SSID DATA TRANSMISSION

CROSS-REFERENCES

This application incorporates references to U.S. Provisional Patent Application 63/628,027 filed Jun. 12, 2023 "Smart Appless WiFi Hotspot SSID Data Transmission. Joseph Lai and Paul Janson are the inventors for the above provisional patent applications. This patent application is also related to U.S. Pat. No. 11,772,513B1 Smart Battery Communication System for Vehicle, Joseph Lai and Paul Janson are the inventors as well.

BACKGROUND OF THE INVENTION

Modern day smartphones serve as great personal communication devices which have totally revolutionized telecommunication applications. Smartphones primarily require service providers to make them useful, such as making voice calls, texting, browsing the internet and many other useful applications with apps/software to download, install and run whatever users want. Modern day smartphones are loaded with hardware features working amazingly together with these apps from app developers. There are apps that are already part of the operating systems which are pre-installed on smartphones and of course, after market apps which fulfill users needs as well.

However, apps can be problematic for many app users. Most apps are very low cost to purchase or are distributed to download but have a tremendous cost to the developers to develop, and distribute, to market. Apps not only have be compatible with both Apple's iOS and Googles Android operating systems but also have to be compatible with all versions of IOS and Android smartphones that are on the market plus thousands, if not more different brands of smartphones from other manufacturers. It's truly a nightmare to deal with that situation for app developers whose apps can be loaded with viruses, adware, Spyware and all sorts of dangerous and harmful things from untrustworthy vendors. One example, FLO is a free app which for women's fertility control simply takes away their privacies. Women are hesitant of using such apps nowadays.

Apps have privacy issues which are one thing, the user experience is another. For simple wireless applications of small DATA, short messages, reading simple information from sensors or small useful messages (or IoT related) without using apps, must have a better solution. The answer is YES. Both android and iOS smartphones already have apps we can use that are present on the phone already.

This present invention can read small, simple, short forms of DATA without any apps, no need for designing, developing, debugging, maintaining, testing and uploading to app stores. End-users do not have to connect to internet, pay developers, download, install and run any apps. There is absolutely no risks of bank account, password, personal information and any privacy issues.

For the DATA gathered by either sensors or any other information providers, unlike traditional, conventional means of DATA transmission, this new invention teaches systems designer to take the DATA they have gathered, encoded, encrypted, and will be inserted and attached to existing Wi-Fi's SSID (Service Set Identifier) (as in beacon frame; sending out every 100 mS; up to 32 characters with letters, numbers, and special characters such as Chinese) for all users or machine to receive, read, analyze and process. Transmission can be done as point to point or point to multiple points.

FIELD OF THE INVENTION

This invention is about new features of modifying/retrofitting/improving modern day existing wireless WiFi technologies of smartphone computers or equivalent for simple, small and short form DATA communication applications. Such DATA is gathered, encoded, encrypted, add on and inserted in regular WiFi's SSID (Service Set Identification) format then transmitting the new modified SSID (with dynamically updated (or fixed) information attached) from one point to another point and/or broadcast/simulcast from one point to multiple points for human end-users and/or machines to receive, read, recognize, analyze and process. Typical simple, small, short forms DATA such as gathered from sensors automatically measuring temperature, humidity, distance, weight, battery voltage, earthquake activity IoT devices and/or from human messages such as public announcement, stock quotations, news . . . and/or all other useful information without using additional hardware or software for end-users and compatible to all models of modern day computers, smartphones, tablets and works for all different versions of operating systems such as Android, IOS, Linux and Windows.

SUMMARY OF THE INVENTION

This present invention simplifies and improves simple, short/small wireless DATA transmission and receiving of IoT related applications by inserting, encoding and attaching variable DATA information through standard IEEE 802 WiFi SSID (Service Set Identification) for end-users to read by using their smartphones, tablets or PC without any means of downloading, installing, running any additional software/apps and/or special extra equipment/hardware.

Please check the comparison chart below:

| INVENTORS' "APPLESS" WIFI SSID DATA TRANSMITTER vs. PRIOR ART | | | | |
|---|---|---|---|---|
| COMPARE: | PRESENTED APPLESS WIFI SSID DATA | CONVENTIONAL WIFI SYSTEM (PRIOR ART) | BLUETOOTH (PRIOR ART) | NFC/ RFID (PRIOR ART) |
| REQUIRES SPECIAL APPS? | NO | YES | YES | YES |
| WRITING, DESIGN, TEST, PAY THE APPS? | NO | YES | YES | YES |

-continued

| INVENTORS' "APPLESS" WIFI SSID DATA TRANSMITTER vs. PRIOR ART | | | | |
|---|---|---|---|---|
| COMPARE: | PRESENTED APPLESS WIFI SSID DATA | CONVENTIONAL WIFI SYSTEM (PRIOR ART) | BLUETOOTH (PRIOR ART) | NFC/ RFID (PRIOR ART) |
| UPLOADING APPS TO APP STORE? | NO | YES | YES | YES |
| GETTING APPS STORES TO APPROVE? | NO | YES | YES | YES |
| REQIRES WEB BASED APPS? | NO | YES | YES | YES |
| REQUIRES APPS FOR ANDROID, iOS, LINUX OR WINDOWS? | NO | YES | YES | YES |
| NEEDS MAINTAINING COMPATIBILITY OF APPS BASED ON VERSIONS OF OPERATING SYSTEM? | NO | YES | YES | YES |
| REQUIRES ACCESS TO INTERNET TO DOWNLOAD APPS? | NO | YES | YES | YES |
| REQUIRES DOWNLOADING THE APPS? | NO | YES | YES | YES |
| REQUIRES INSTALL APPS? | NO | YES | YES | YES |
| REQUIRES EXTRA STORAGE MEMORY FOR THE APP? | NO | YES | YES | YES |
| REQUIRES RUNNING THE APPS TO RECEIVE DATA? | NO | YES | YES | YES |
| REQUIRES SETTING UP PARAMENTERS? | NO | YES | YES | YES |
| REQUIRES PAIRING APP TO THE DEVICE? | NO | YES | YES | YES |
| REQUIRES VERIFYING THE USER ID PASSWORD? | NO | YES | YES | YES |
| REQUIRES CLOUD SERVER? | NO | YES | YES | YES |
| REQUIRES CREAT/PAY CLOUD ACCOUNT LIKE MQTT, IFTTT, NODE RED | NO | YES | YES | NO |
| REQUIRES OF USING BROWSERS? | NO | YES | YES | YES |
| REQUIRES CONNECTING APP TO DEVICE? | NO | YES | YES | YES |
| USING QR CODE TO DOWNLOAD APP? | NO | YES | YES | YES |
| DATA TRANSMISSION ONLY LIMITED OF POINT TO POINT? | NO (POINT TO MULTI- POINTS OK) | NO | YES | YES |
| VIRUS PROBLEM? | NO | YES | YES | YES |
| ADWARE? | NO | YES | YES | YES |
| SPYWARE? | NO | YES | YES | YES |

-continued

INVENTORS' "APPLESS" WIFI SSID DATA TRANSMITTER vs. PRIOR ART

| COMPARE: | PRESENTED APPLESS WIFI SSID DATA | CONVENTIONAL WIFI SYSTEM (PRIOR ART) | BLUETOOTH (PRIOR ART) | NFC/ RFID (PRIOR ART) |
|---|---|---|---|---|
| BANDWIDTH REQUIREMENT OR FREQUENCY SPECTRUM | LOWEST | VERY HIGH | HIGH | HIGH |
| GETTING DATA | FASTEST | SLOW | SLOWEST | SLOW |
| TRANSMISSING DISTANCE (ONLY READ SSID ) | GREATEST | POOR | BAD | Worst |
| LARGE DATA OR VIDEO STREAMING | NO | YES | NO | NO |
| DATA SECURITY | YES | YES | YES | YES |
| COST | LOWEST | HIGH | HIGH | HIGH |

BRIEF DESCRIPTION OF THE DRAWINGS

Like reference numerals refer to like parts throughout the several views of the drawings

DETAILED DESCRIPTION OF THE PREFERRED EMBODIMENTS

This present invention provides a new application for fast, simple, easy and lowest-cost means of wireless DATA communication taking advantage of existing popular WI-FI protocols.

Figure 1:
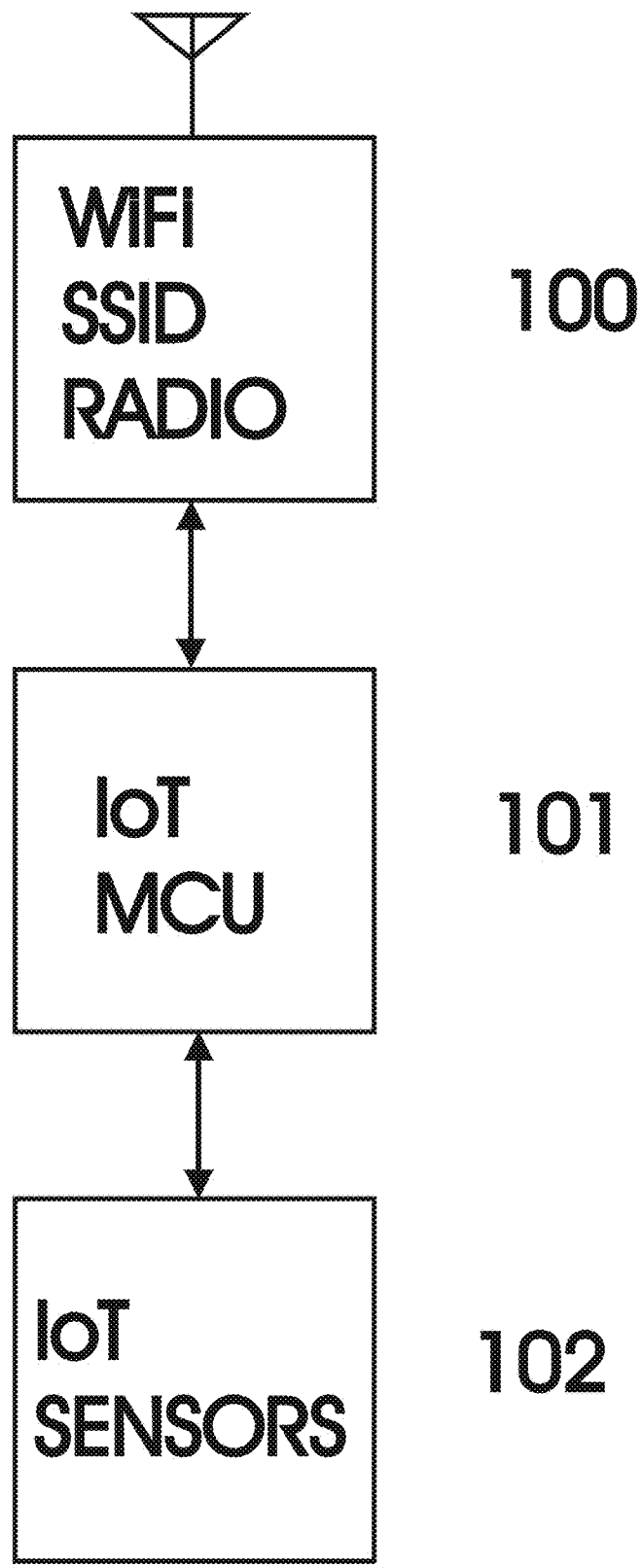
FIG. 1 illustrates the block diagram of a typical wireless IoT sensor using Wi-Fi system.

FIG. 1 shows the present invention block diagram of WiFi IoT system by using SSID with (100) transmission only normally operating at the standards of 900 MHZ (IEEE 802.11ah HaLow) 2.4 Ghz (IEEE 802.11 BGN) 5.0 Ghz (IEEE 802.11AC) and 6 Ghz (new WiFi 6, 7). (101) micro controller unit (MCU) with ROM, RAM and general purposes I/O (GPIO) interfacing between, (100) and (102) sensor either digital and/or analog signals. Typically (102) sensors as input devices such as temperature probes receiving variable DATA to (101) MCU then send to (100) wirelessly to end-users and/or machines to read, analyze, react and process the sensors.

Figure 2:
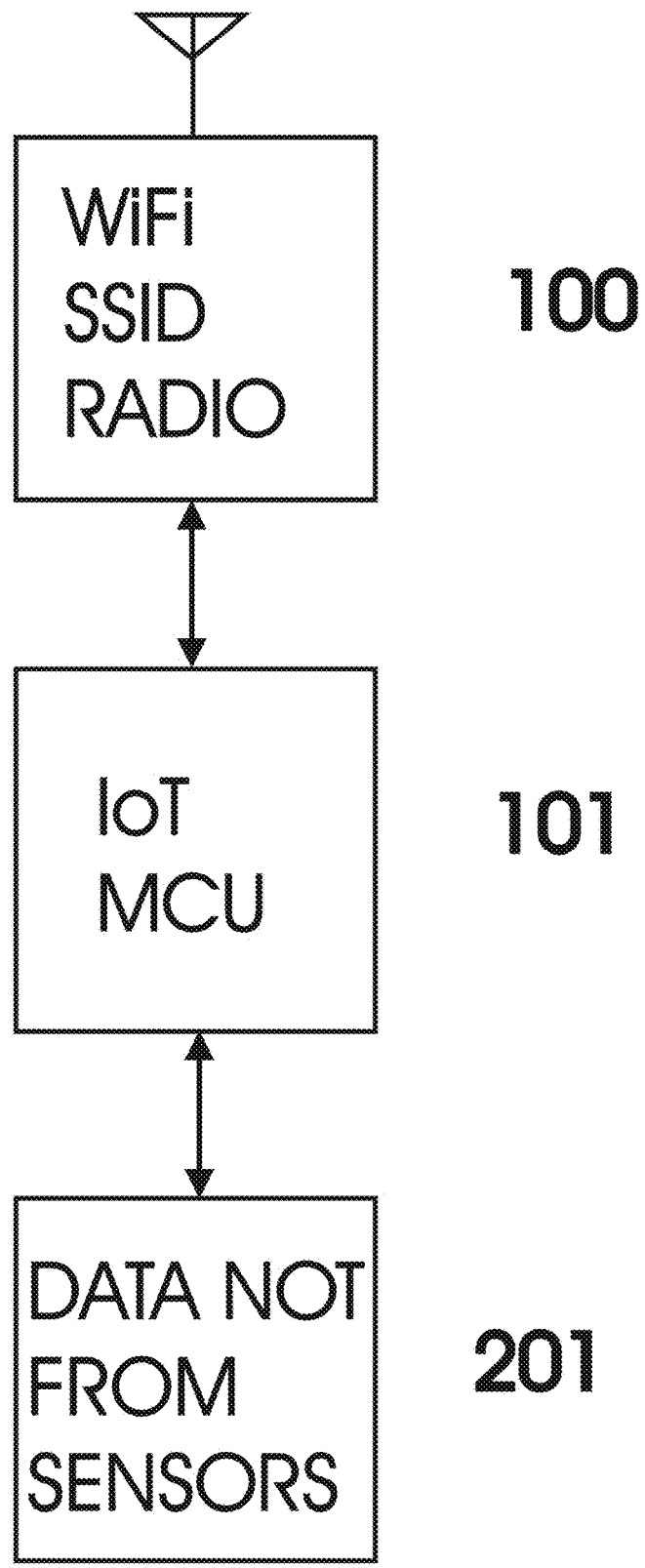
FIG. 2 illustrates the block diagram of a typical wireless text DATA message using Wi-Fi system.

FIG. 2, shows another type of applications for DATA communication without automated sensors such as manually generated information with (201) can connect to a keyboard with messages to end-users and/or machines to read, react and process the messages. For example, alert messages of bad weather, accidents, stock price quotations or whatever useful information.

Typical old fashion Wi-Fi devices are very sophisticated and complex with two different operating modes to provide wireless internet services from internet service providers (ISP) to end-users; the WiFi devices connected to ISP acting as wireless router working as access point (AP) and for end-users equipment to access such as smartphones, tablets or computers are named as stations (STA). In other words, all end-users as slaves and the wireless router as masters. For end-users (STA) to access to AP to avoid confusion or mistakes, AP must let STA to know the identity of their AP just like old fashion FM/AM radio broadcast on which frequency. The all digitally Wi-Fi system simply transmitting a short name (numerical and/or alphanumerical) Service Set Identifier (SSID) to all nearby STA to connect with or without password. Wi-Fi is great, unlike wired Ethernet, Billions people use it every day logging in to the SSID of an AP, access to internet for Billions of applications. SSID, in the typical applications of end-users connecting their smartphones to internet, serving as one of the most important element, therefore, SSID can not change, will never change for internet users.

However, in the IoT or some other applications, access to internet is not necessary and DATA is very simple. SSID can be changed for many useful applications.

By simply looking at the block diagram (100) of this present invention transmitting DATA using SSID, this is a transmission only, one way wireless DATA broadcasting system. There is no receiving circuitry, no baseband conversion, no demodulation, no signal processing, no error correction, decoding or whatever hardware required. No protocol stacks of complicate software/firmware implementation of the IEEE802.11 communication protocols, no DATA buffering/storage, no need of massive RAM and/or flash ROM for MCU coding, no need of powerful MCU, no routing of IP addresses, no processing, no time domain duplex (TDD/TDMA) switching on/off of transmitting or receiving from/to the antenna. No acknowledge of transmission or handshaking. One can imaging this present invention is the simplest, the fastest, the cheapest, the least power consumption and the longest distance communication range to design the integrated circuitry and manufacturing of the SSID transmission only chips to the best benefits of all appropriate applications for commercial, industry, scientific, medical and military users.

Figure 3:
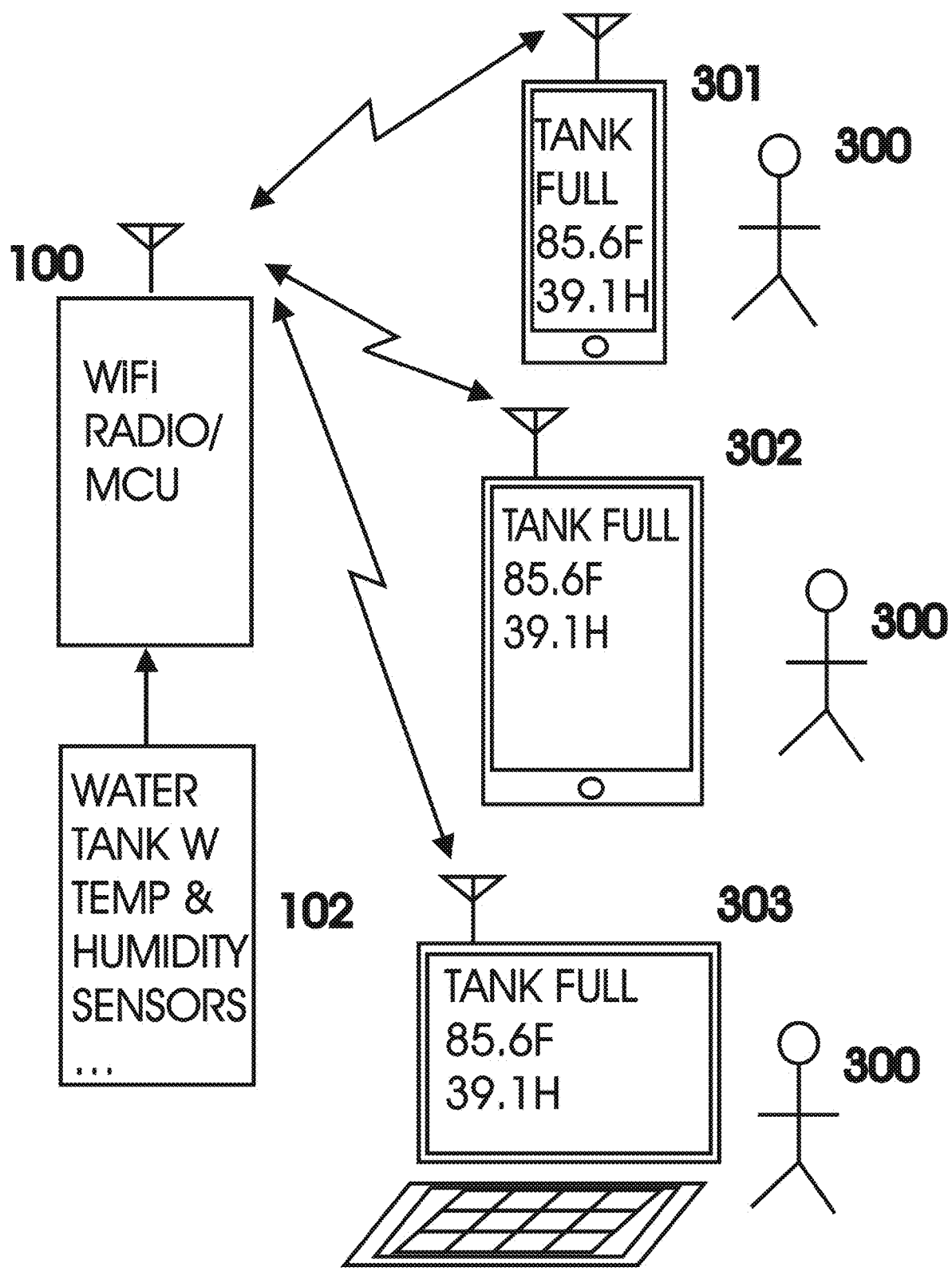
FIG. 3 illustrates human interface of using typical smartphone/tablet/PC to read sensors for IoT applications.

FIG. 3 shows the new means of wireless DATA transmission by piggyback some useful variable DATA. (102) as sensors to detect end-users' water tank is full, temperature and humidity information feeding to (100) inserting, combining and attaching that information to APPS SSID, then transmitting to the smartphone (301) tablet (302) or PC (303) for end-users (300) to read.

Figure 4:
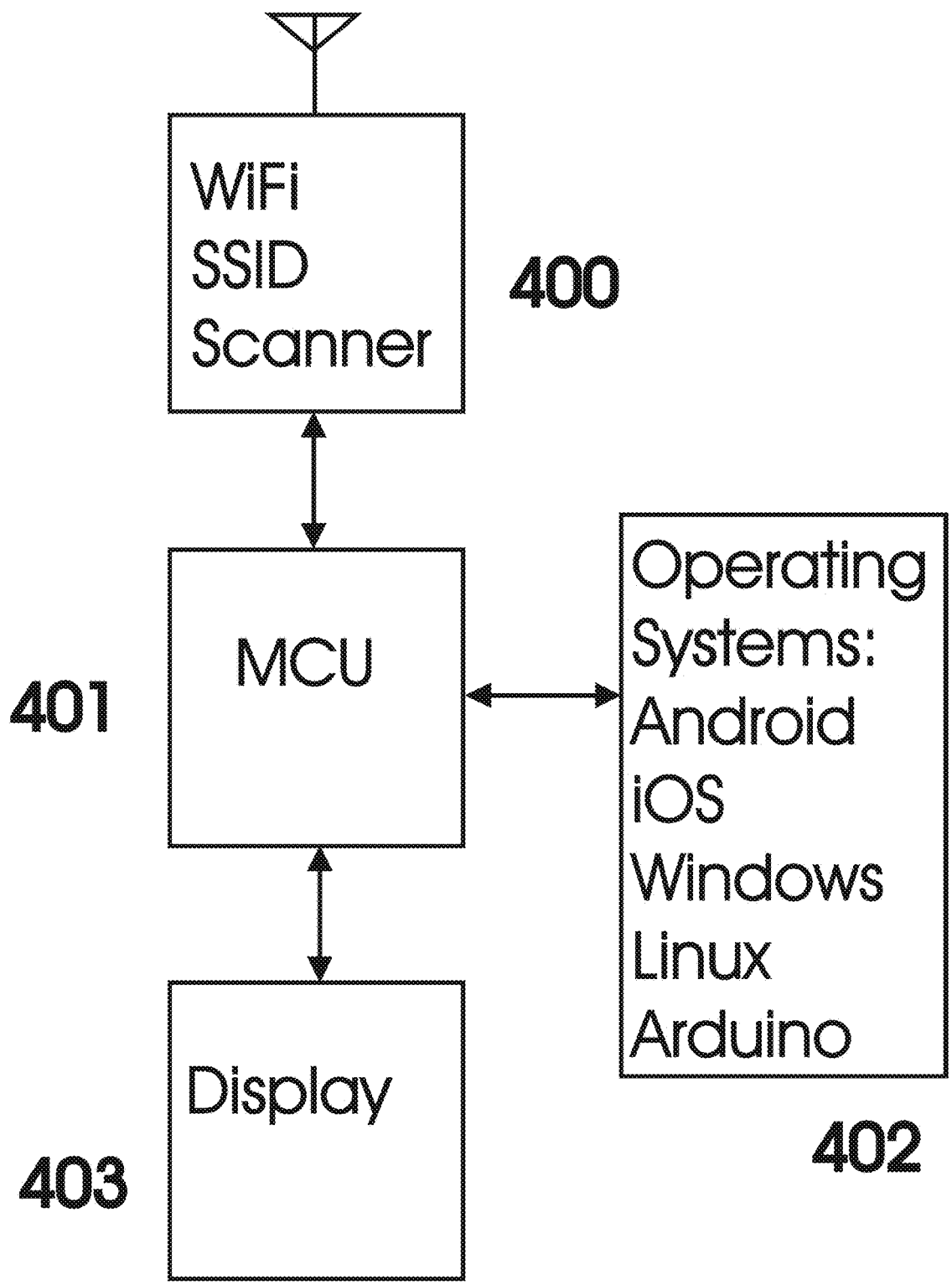
FIG. 4 illustrates the block diagram of a smartphone receiving IoT DATA by reading/scanning the received SSID information.

FIG. 4. Shows the inside of the (301) (302) and/or (303) of modern day smartphone with (400) receiving and scanning all nearby SSID from all nearby AP. (401) MCU with the assistance of (402) operating systems (Android, IOS . . . ) decodes and sending the SSID to (403) displays.

Figure 5:
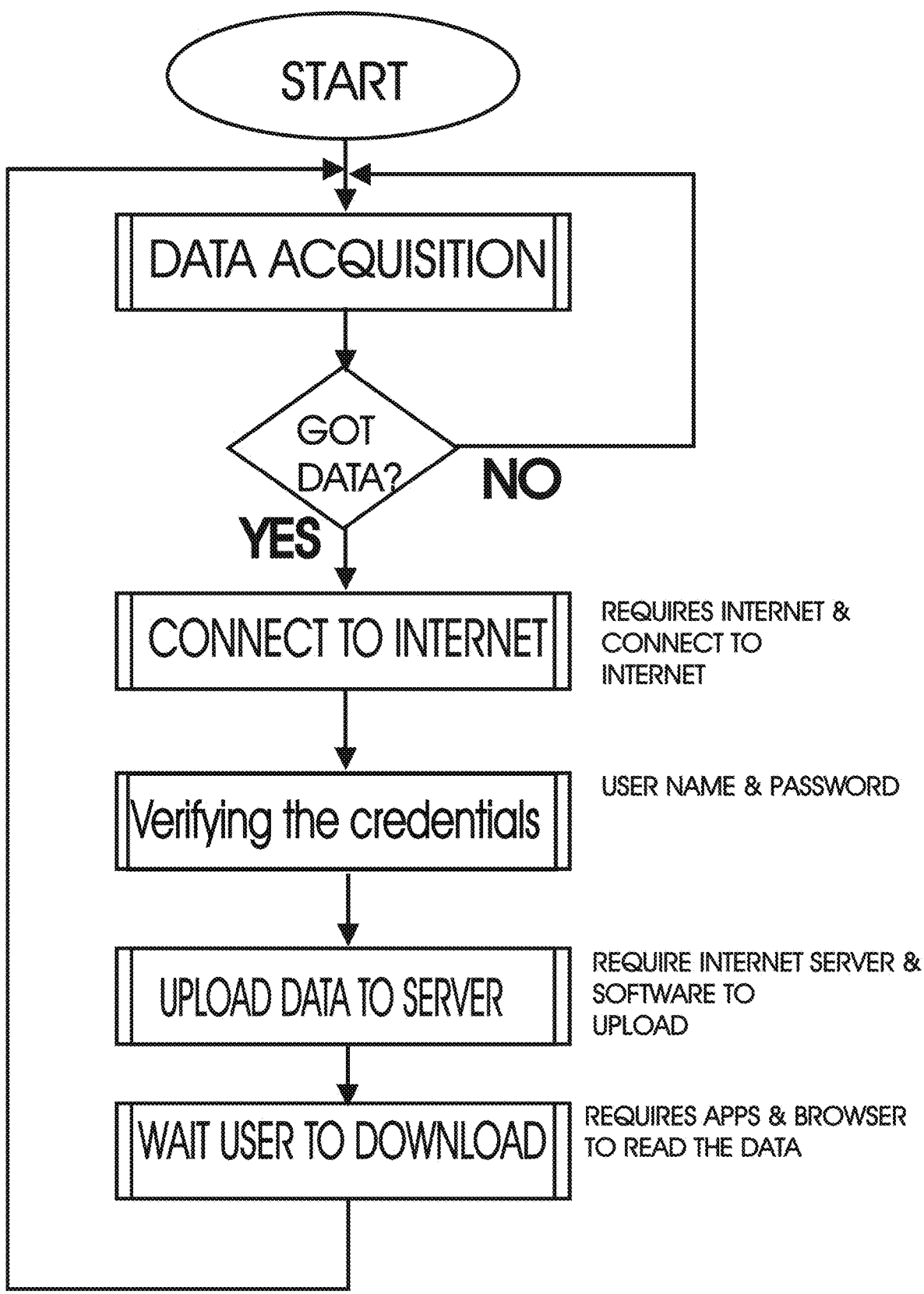
FIG. 5 illustrates the flow chart of prior art of typical DATA transmitted from sensors to end-user.

FIG. 5. Shows prior art of a flow chart of traditional IoT DATA acquisition systems. Data must be uploaded to cloud (internet servers) or local servers (intranet) and End-users have to connect to internet through AP with selection of SSID and password then download, then run some special and dedicated APPS (if already downloaded to their smartphones) to receive the DATA. Similar to access to an email account.

Figure 6:
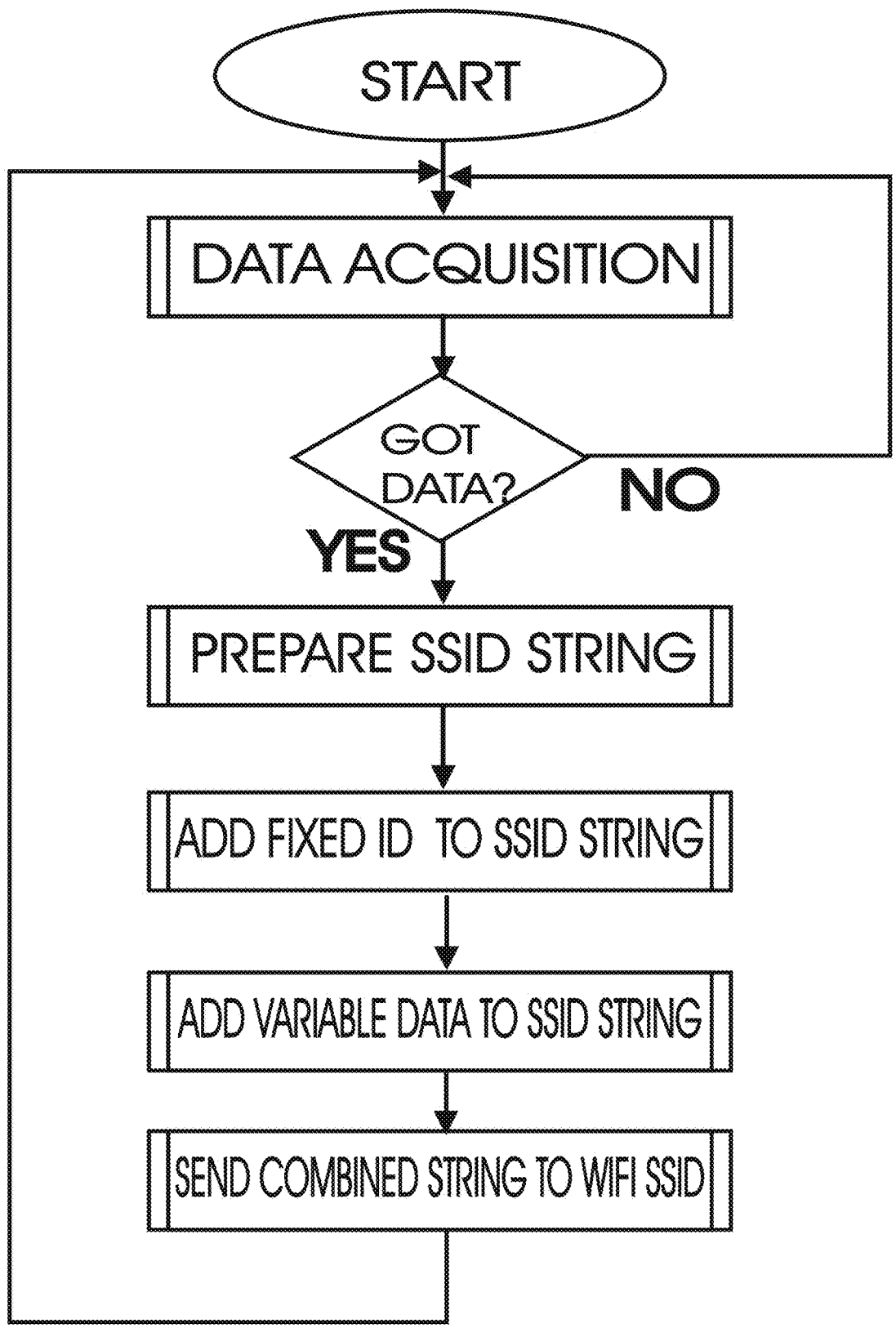
FIG. 6 illustrates the invention of DATA transmission from sensors to end-user by using SSID.

FIG. 6. Shows the flow chart of present invention that acquired DATA simply Just attaching, inserting and combining to the SSID of an AP (or pseudo AP). Please note "combining" as if and when multiple IoT devices exist, there must be some means of which IoT device is which by assigning an ID (or name) then combining the inserted, attached variable DATA information for end-users or machines to receive, read, process.

Figure 7:
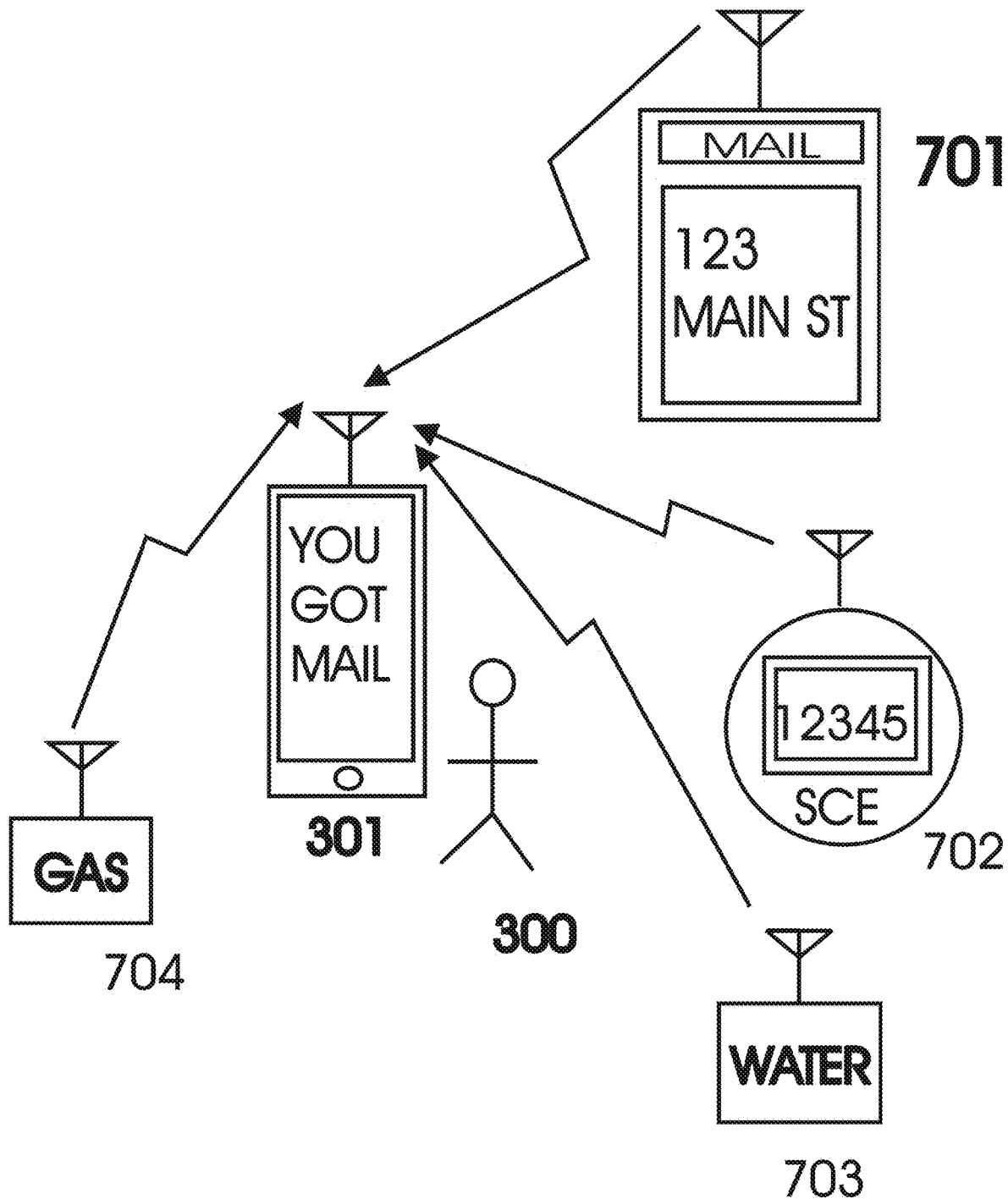
FIG. 7 illustrates an example of using SSID to notify smartphone user of his/her mail has received from postal service.

FIG. 7. Shows a simple example of present invention. (300) end-user receiving a message "YOU GOT MAIL" from (701) when mail delivered by mailman inserting the mail by opening the mailbox which triggers (power ON) then SSID sends to (301) smartphone.

FIG. 7. Further shows smart utility meter such as electricity, water and gas meter reading by (300) meter reader personnel from service providers with personal smartphone (301) checking (702) for electricity (702) water and (703) gas usages. Of course, since the meter information is transmitting through SSID, the electricity, water and gas usage information can also easily available for home owners to check and help them aware of energy conservation or detecting water or gas leak in case of emergency.

Figure 8:
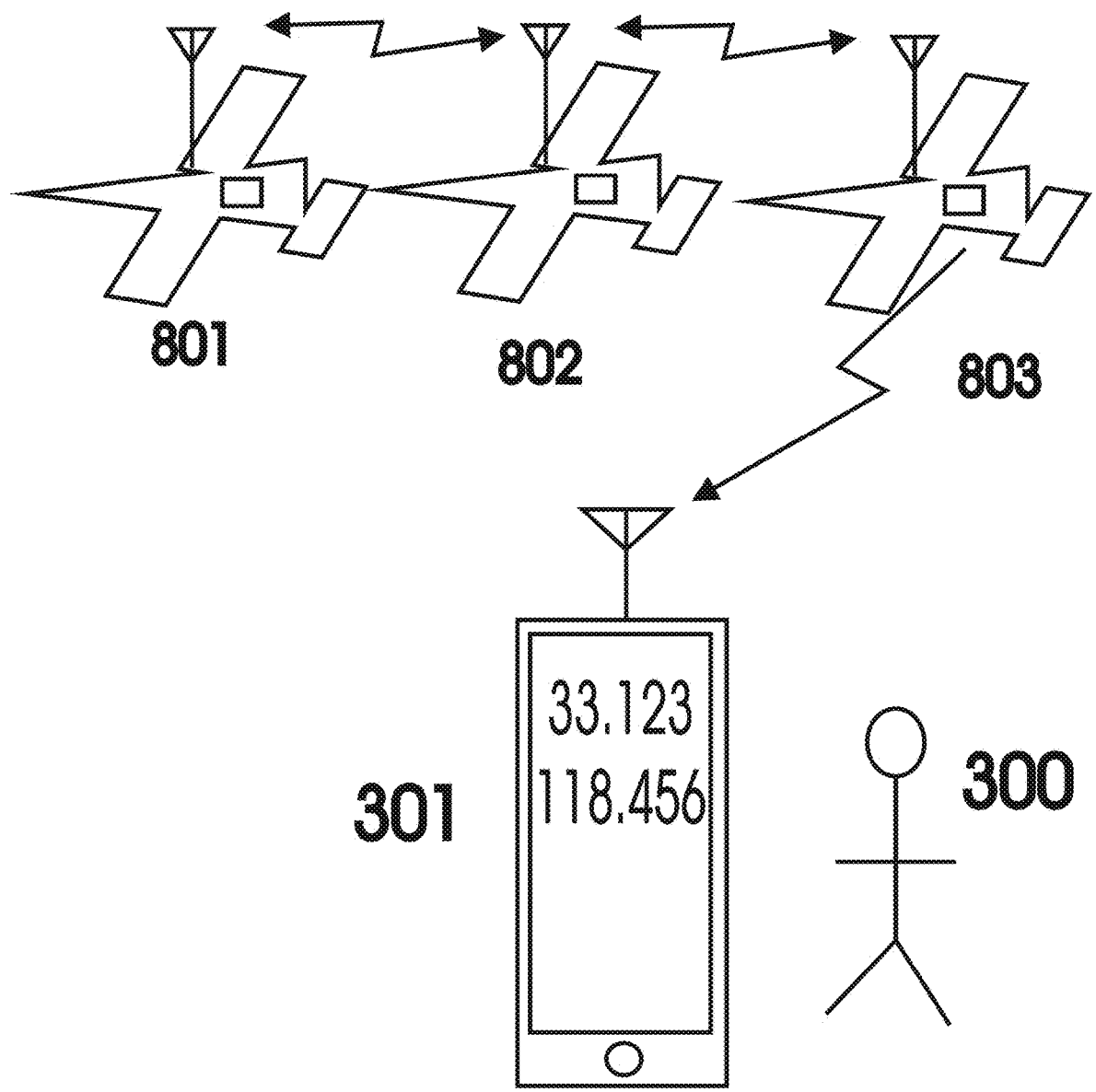
FIG. 8 illustrates another example of transmission of GPS longitude/latitude information to adjacent aircraft and end-users/passengers.

FIG. 8. Shows an example of present invention for aviation applications. (803) aircraft sending GPS longitude and latitude DATA to line of sight adjacent aircraft (802) and (801) as collision avoidance information simple to new FAA mandated ADS-B as a backup in case of failure of the ADS-B or for (300) passengers on board to check with their smartphones.

Figure 9:
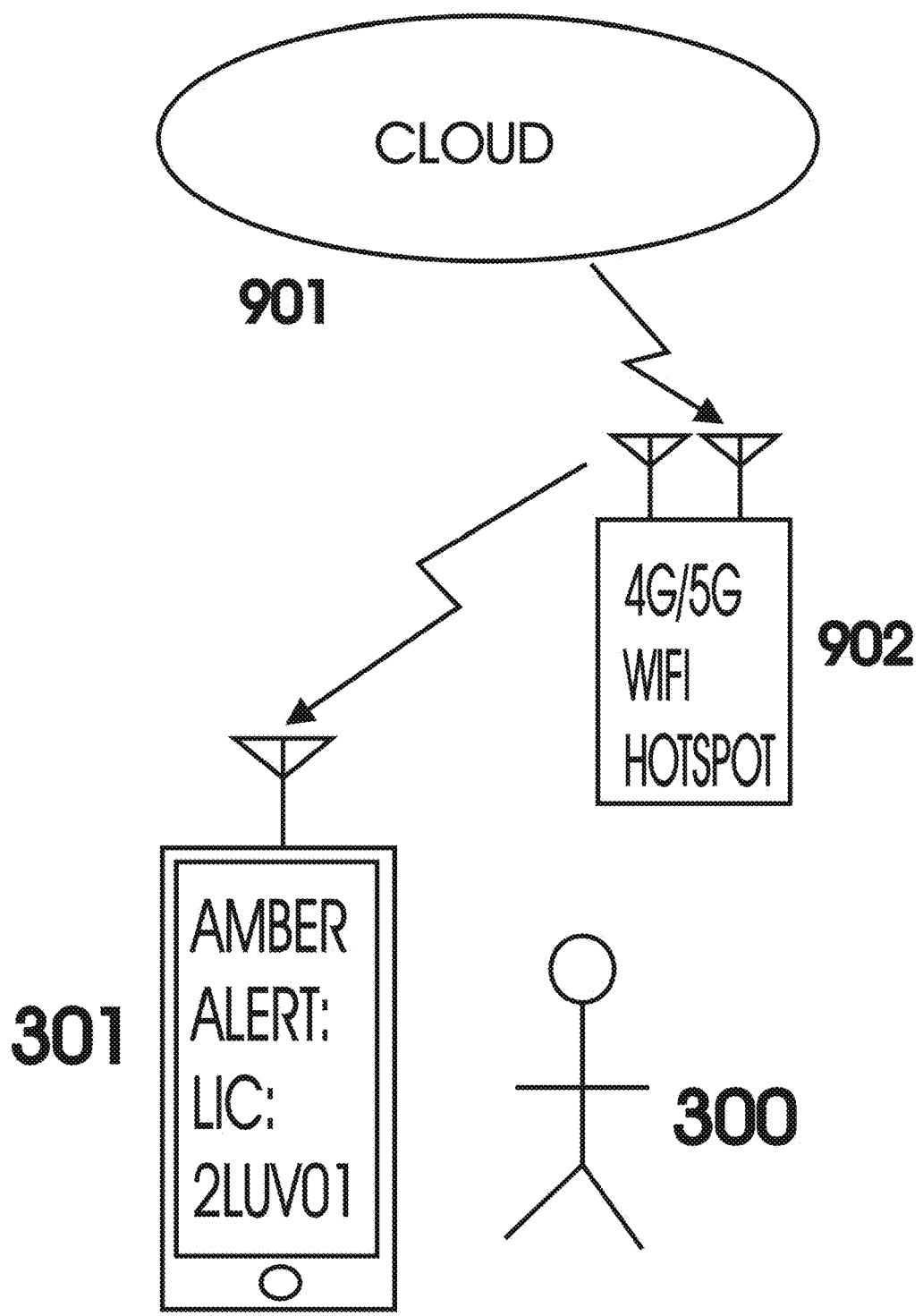
FIG. 9 illustrates non sensor generated messages can also using SSID for safety security applications such as Amber Alert of tracking a missing person/vehicle.

FIG. 9. Shows an application of the present invention as non automatic sensors types of DATA such as Amber Alert. (902) is a Hotspot of cellular phone network receiving (901) from cloud then inserting, attaching the Amber Alert messages to (301) smartphones of (300) end-users.

Figure 10:
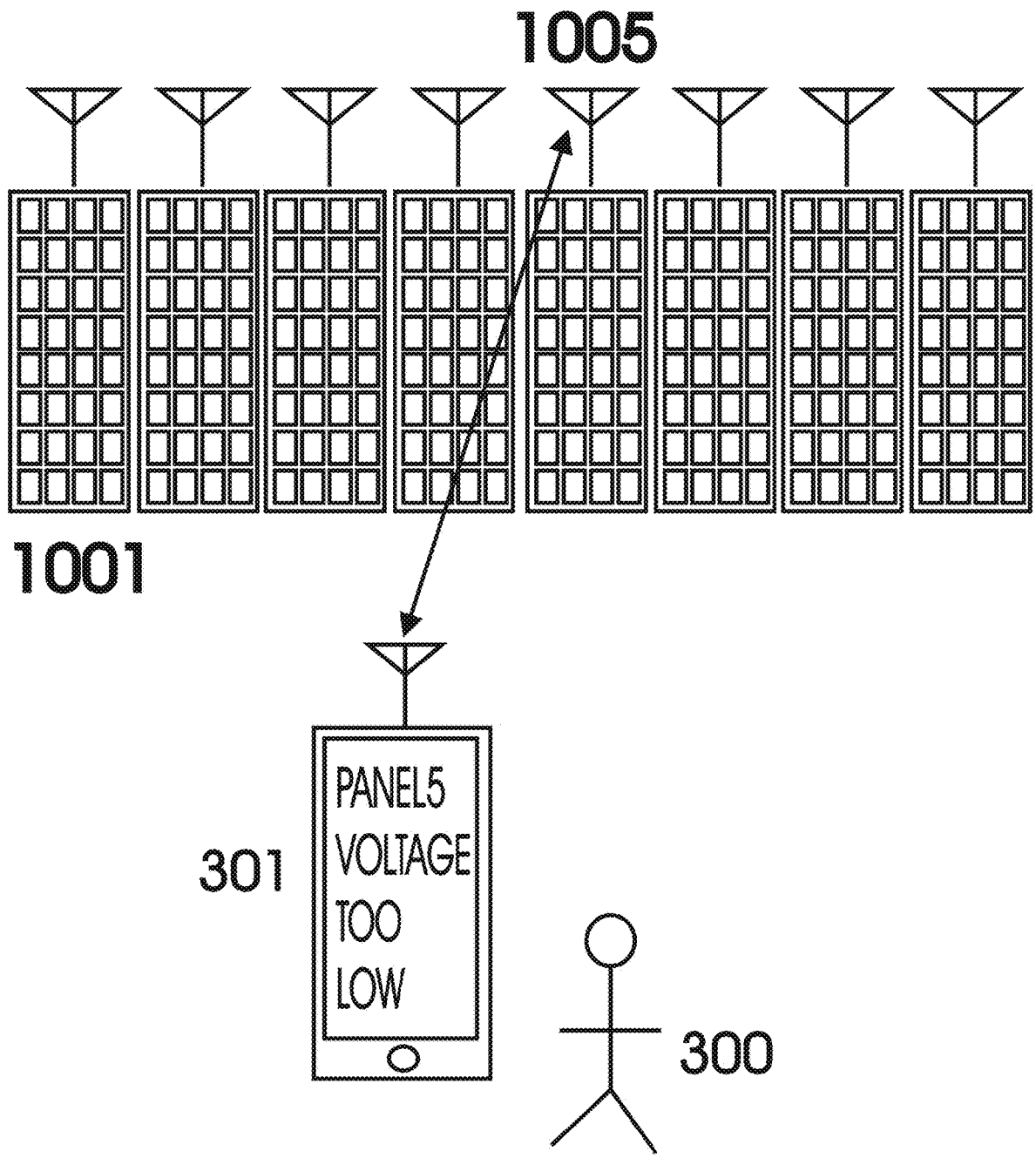
FIG. 10 illustrates application for solar panels.

FIG. 10. Shows a great application of present invention for monitoring solar panels. It's difficult to check or troubleshoot when multiple solar panels are connected together either in serial or parallel. (1001) the array with (1005) solar panel malfunction. (300) Technicians simply use personal smartphones (301) to read/scan the SSID to fix or replace bad panel without going through all panels sometimes very difficult to work on top of a roof or just too far away.

Figure 11:
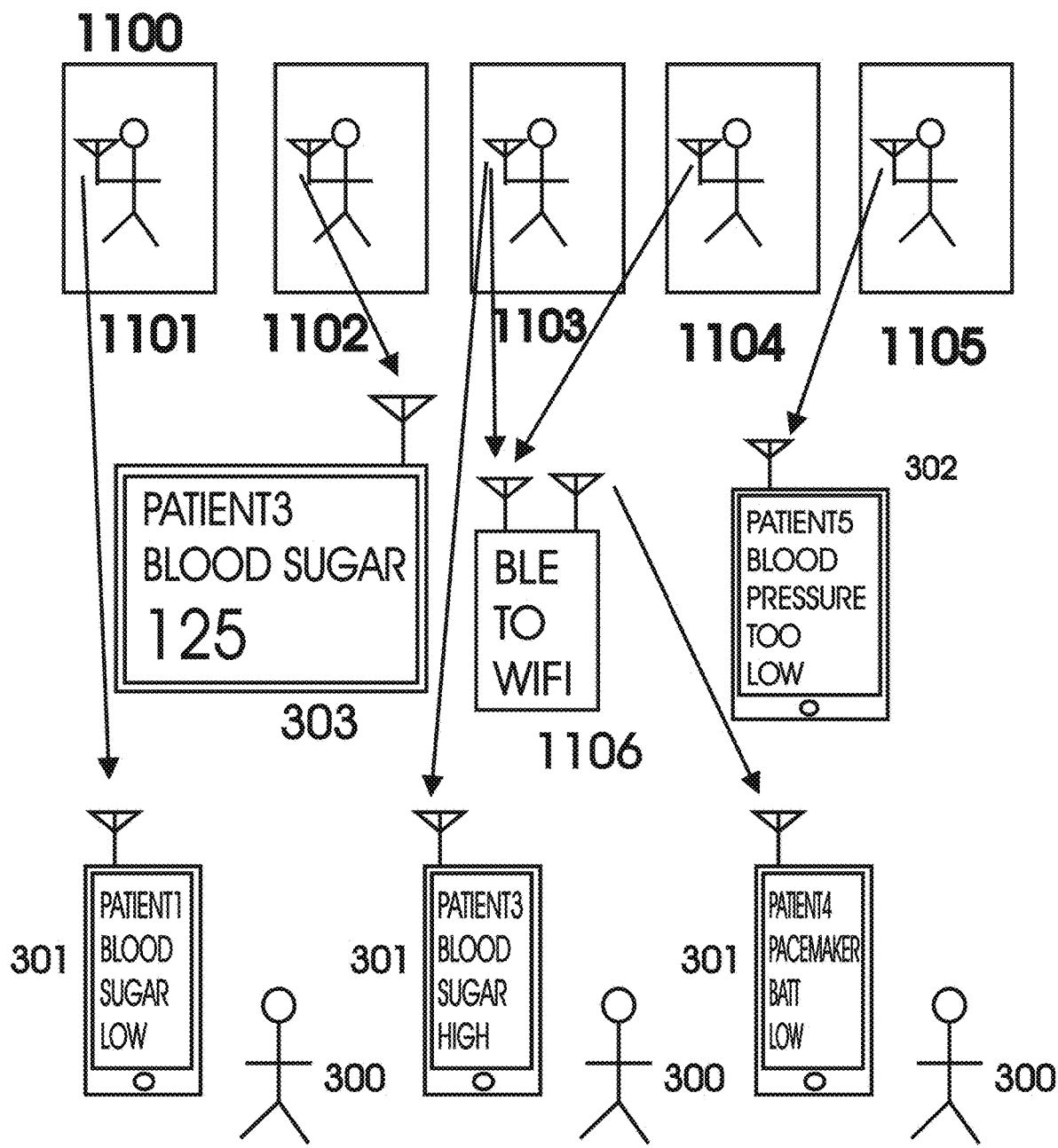
FIG. 11 illustrates Healthcare application using present invention to save patients in case of emergencies.

FIG. 11. Shows applications of present invention for medical Healthcare. (1100) as hospital or nursing home bed with patients (1101 . . . 1105) all have issues with modern day monitoring devices or wireless wearable gadgets such as continuous glucose monitor (CGM) for measuring blood sugar. Patient (1101) has a SSID CGM device for (301) smartphone of (300) nurse, practioner or caregiver. For old fashion CGM patients (1103, 1104) without SSID using Bluetooth, (1106) is a translation device or Bluetooth to SSID bridge for another nurse (300) To read with personal (301) smartphone. Please note present invention of using SSID for medical Healthcare applications are much faster than traditional communication means may save many lives.

Figure 12:
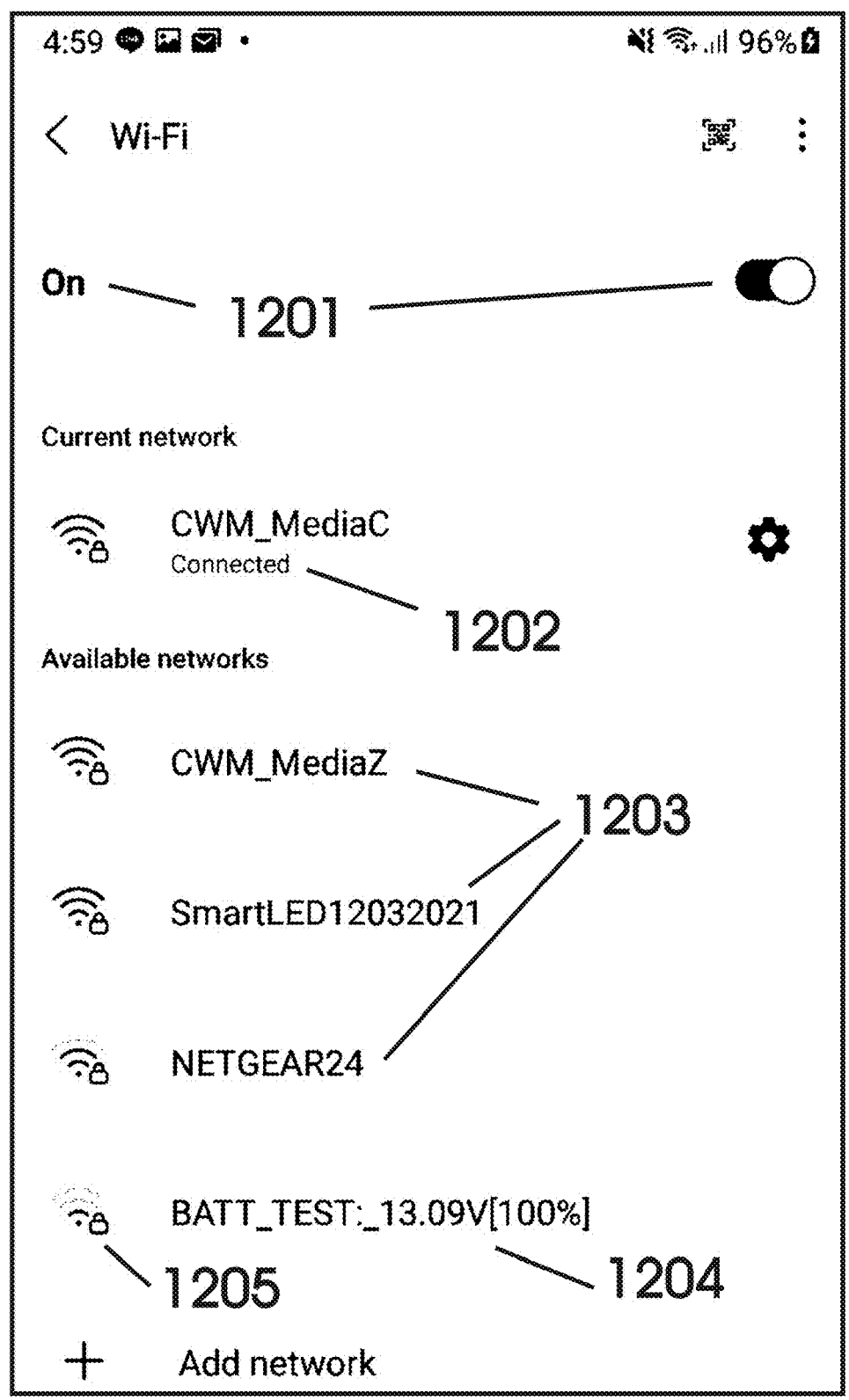
FIG. 12 illustrates the user-interface of present invention by using end-users smartphone to check the voltage of a battery.

FIG. 12. Shows the user-interface of present invention by using end-users' smartphone to check the voltage of a battery by check SSID without APPs. Such as a solar panel or vehicle starting batteries voltage check. (1200) a screenshot captured the variable DATA. For Android 11 users, turn on phone, then hit "Settings" icon menu on touch screen, then go to "Connections" then go to "WiFi". Turn WiFi ON (1201) if not already ON. Hit WiFi, the screen will be showing and scanning all current and nearby networks of AP. (1203) shows all other AP near the users as internet AP and (1204) is a dummy or soft AP "BATT_TEST:_13.09 [100%]" is the battery condition for testing. 13.09 is the voltage which is at 100% full. Please note (1205) is the signal strength of the battery tester. In case of multiple batteries need to be tested, (1204) "BATT_TEST:" can be serialized as "BATT_TEST: 001". If similar reading shows, the users can check the signal strength to detect or authenticate the AP without DATA encryptions. Please also note (1202) as the user's smartphone is still "CONNECTED" to "CWM_MediaC", a real AP connected to internet while reading the (1204) input without interruption of internet connection. Typical WiFi signals can travel up to 300 ft (just reading SSID can reach much further) in a good Line-Of-Sight distance which is great for remote measurement of all kind of IoT applications and DATA information is point to multi-points to broadcast to all users simultaneously in real time.

Figure 13:
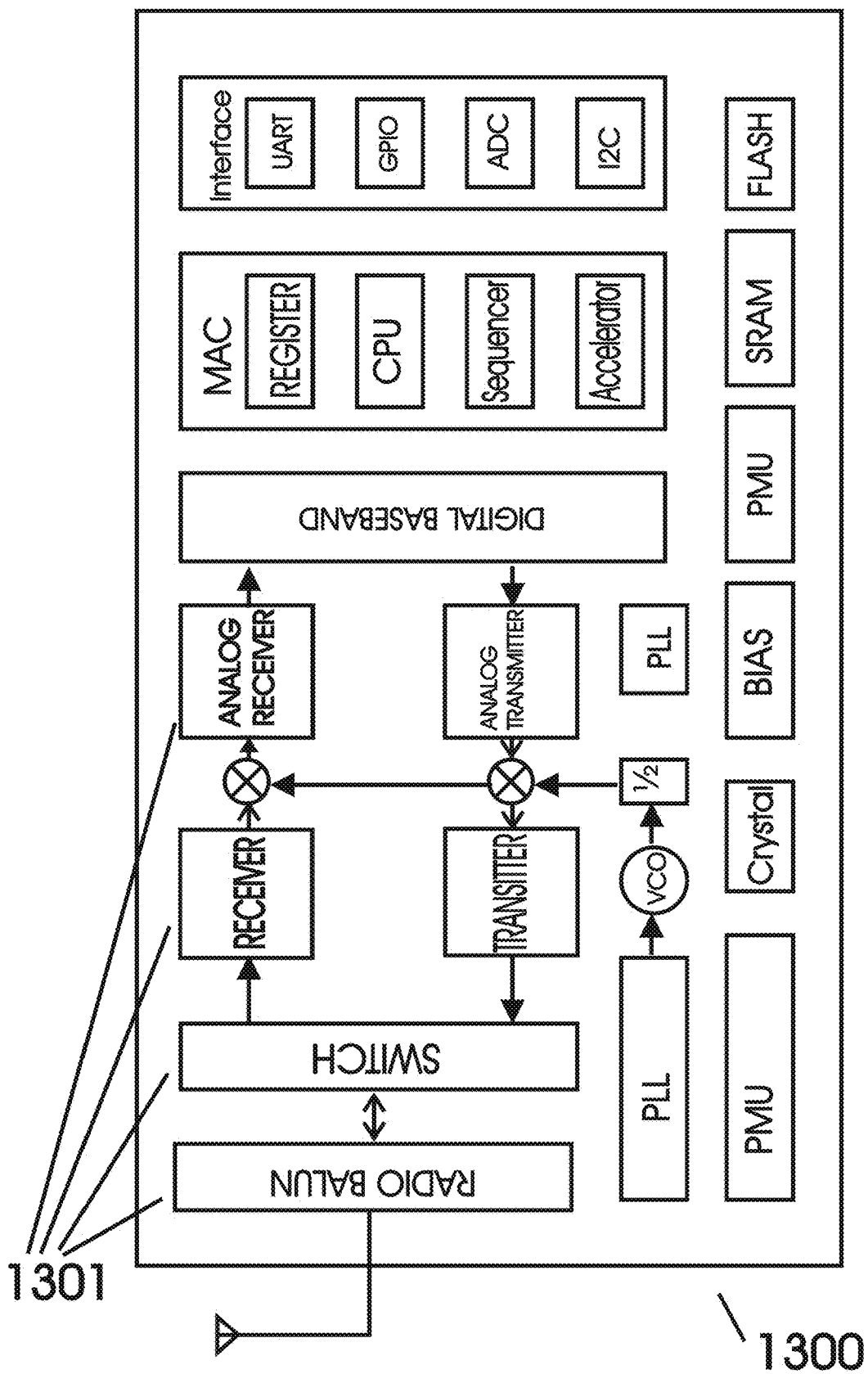
FIG. 13 illustrates the prior art of typical integrated chip for WiFi IoT applications.

FIG. 13 is the block diagram for current WiFi IoT chips such as the popular ESP8266. Very powerful, have all the functionalities to connect to internet (STA) mode or a soft AP which has capabilities of running HTTP codes to make the chip as a web server for users to login to access the content of the IoT data without connecting to internet.

(1301) are all the ESP8266 receiver associated circuitries, the balun (balance and unbalance), the switch which flip-flop the transmission and receiving the mixer, the decoder.

Figure 14:
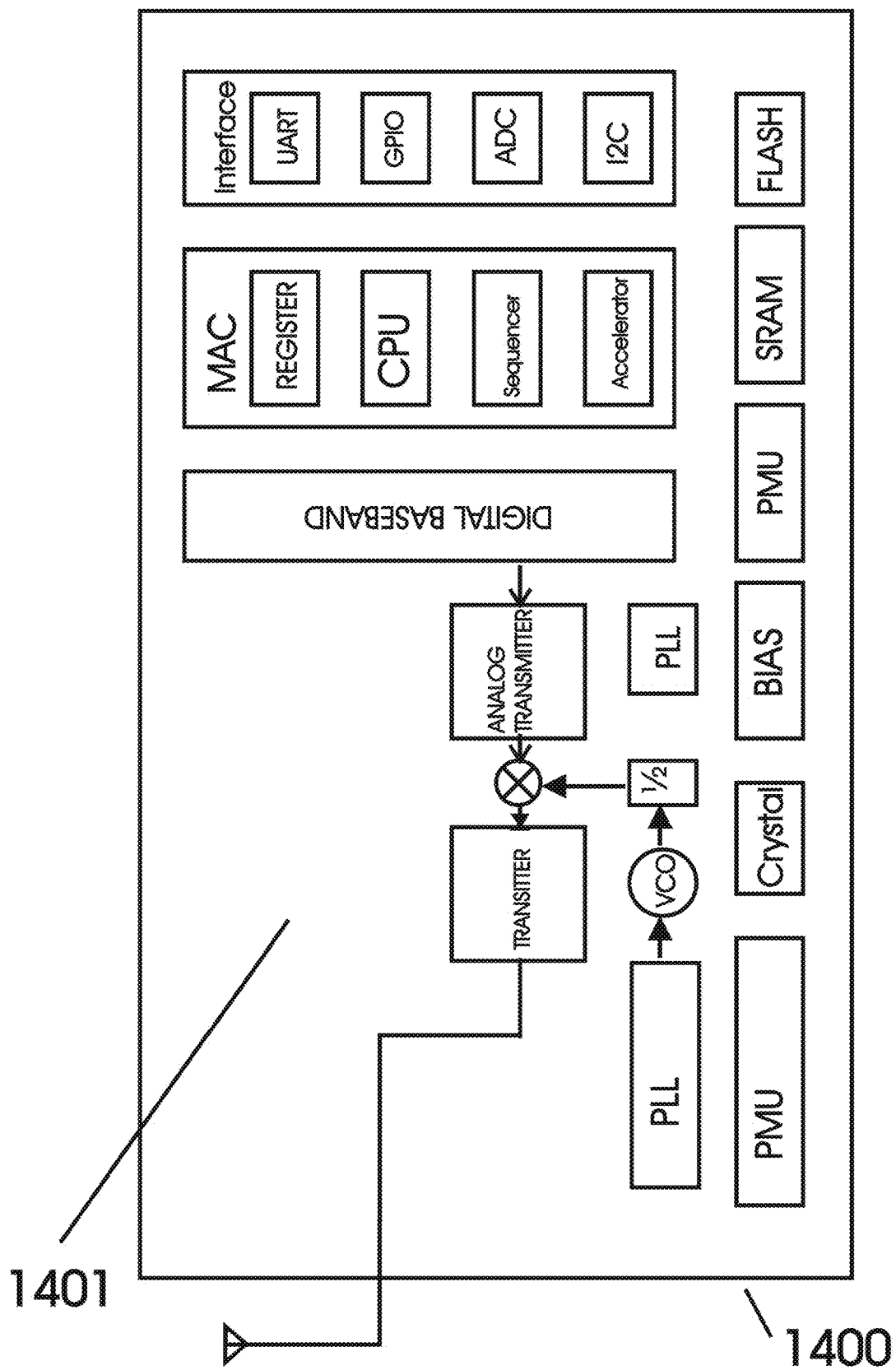
FIG. 14 illustrates the present invention new integrated chip for WiFi SSID which is tremendously simplified.

FIG. 14 is the block diagram of the present invention new integrated chip for only transmitting DATA through SSID characters string without (1401) receiver circuitries. One can see the new chip can dramatically reduce the complexity of the regular chip for all applications. No massive of RAM or Flash ROM, no need of powerful 32 bit MCU as 8 bit is enough. No receiver and related circuitry.

The advantage of the new chip:
1. Saves tremendous power
2. Saves tremendous NRE, manufacturing cost of ASIC chips (SSID sending by IEEE802.11B at 11 mbps is much easier than 802.11N at 300 mbps or new WiFi 6/7 almost 1 Gbps)
3. Chip can only have minimal pins (for example, a 3 pins ASIC chip (package of a SOT23-3 surface mount) for temperature (built-in temp sensor) or just a serial number for tracking objects will only power, ground and antenna output or 4 pins (instead of 44) add external AD converter or rs-232 as an input pin)
4. Smaller foot print for PC board for smaller devices
5. Much easier to make the chip with great yield and much reliable
6. Much easier for designing the SSID application products
7. Much easier for manufactures to make the finished products
8. Wearable device can no longer totally depend on expensive Bluetooth for low-power
9. Tremendously reduce traffic of already congested internet
10. Tremendously increase transmission distance range The ESP8266 is a great product but image say the end-user has greenhouse farm or factory automation with 200 temperature sensors? Or a fleet of 200 vehicles? Current painful solution/setup must have a WiFi router to connect to all 200 these IoT devices (STA mode, assigning 200 IP addresses). The present invention is totally, remarkably and miraculously revolutionize that by using just one ESP8266 (as AP) to scan all these 200 SSID transmission only new chips with temperature reading then concentrate it for upload to the internet cloud server (such as IFTTT, MQTT) or simply reading by end-users' smartphone without any APP.

One example application is for tracking golf balls. Since the new invent chip not only so small, so low-cost and consumes very little power, new chips are embedded inside the balls can send out SSID serial numbers for golfers (using their phones without apps) just can not find their balls or tracking the trajectories of their play. The new invention SSID chips, unlike Bluetooth which is expensive, needs to pair, has to connect, must download install app but can never do a point to multipoint tracking by triangulations means of finding/tracking the balls.

Last but not least, the real nice thing with this present invention is no need to pair Bluetooth with very short ranges which is a real pain as it never works without issues. Now when end-users see the SSID in their settings there is no need to login. End-users are surprised by how easy to get their useful DATA by simply using their phones to read/scan SSID. It's not the same as WiFi at your house etc where you have to login. It's just an IoT DATA WiFi broadcaster by SSID.

We claim:
1. A WiFi SSID (Service Set Identifier) DATA communication system, comprising:
   A, a WiFi transmitter;
   B, at least one IoT sensor/DATA input device; and
   C, a WiFi receiver wherein said IoT sensor/DATA input device captures DATA then inserting/attaching said captured DATA into a SSID characters string then wirelessly sending to said SSID characters string to said WiFi receiver by said WiFi transmitter for small, simple, short ioT Data transmission applications;
   wherein said ioT DATA from said IoT sensors are measurements of electrical signals voltage/current/power, temperature, humidity, speed, counting value, pressure, GPS longitude/latitude, shock/vibration, gravity, magnetic force, proximity/electronics geographic fence, radiation, noise, air quality, usages of electricity/water/gas, time/date and/or from all automatic DATA acquisition devices and
   wherein said DATA is from non-automatic DATA acquisition sensor information are from user for vehicle traffic reporting, news, weather forecast, tsunami alerts, currency exchange, stock/commodity/crypto currency pricing and/or small, simple and/or short messages.

2. The WiFi SSID DATA communication system in claim 1, wherein said DATA is for user and/or machine (AI) to receive, recognize, read, copy, analyze, decode, process, re-transmit and/or upload if to internet cloud servers.

3. The WiFi SSID DATA communication system in claim 2, wherein said DATA is delivered to said WiFi users via said SSID by using their smartphones, tablets and/or PCs without login, paring, paying, downloading, installing and/or running special apps and/or software.

4. The Wiki SSID DATA communication system in claim 1, wherein said SSID characters string is transmitting to said WiFi receiver with combined both said IoT sensor/DATA input device identification information plus real-time and/or non-real-time said IoT sensor/DATA input device gathered variable DATA information.

5. The Wiki SSID DATA communication system in claim 4, wherein said IoT sensor/DATA input device gathered variable DATA information is dynamically changing/updating and/or fixed from said IoT sensors/DATA input device for IoT applications.

6. The WiFi SSID DATA communication system in claim 1, wherein said WiFi transmitter is transmitting IoT sensor DATA through said SSID to a single said WiFi receiver and/or multiple WiFi receivers without connecting to internet.

7. The WiFi SSID DATA communication system in claim 1, wherein said DATA in said SSID is encrypted for security purposes and/or non-encrypted for non sensitive DATA to public viewing.

8. The WiFi SSID DATA communication system in claim 1, wherein said WiFi is a standard of IEEE.

9. The WiFi SSID DATA communication system in claim 1, wherein said WiFi receivers are embedded controller device, smartphone, tablet and/or PC running under popular Arduino IDE, Android, IOS, Windows and/or Linux operating and/or development systems.

10. The WiFi SSID DATA communication system in claim 9, wherein said WiFi receiver is running under said Arduino IDE, Android, IOS, Windows and/or Linux said operating and/or development systems are compatible to all their old, current and future versions.

11. A WiFi SSID (Service Set Identifier) DATA communication controller ASIC (Application Specific Integrated Circuit) chip, comprising:
   A, a Wifi SSID transmitter,
   B, at least one IoT sensor/DATA input device, and
   wherein said IoT sensor/DATA input device captures DATA then inserting/attaching said captured DATA into a SSID characters string then wirelessly sending said SSID out by said WiFi SSID transmitter for small, simple, short IoT Data transmission applications;
   wherein said IoT DATA from said IoT sensors are measurements of electrical signals voltage/current/power, temperature, humidity, speed, counting value, pressure, GPS longitude/latitude, shock/vibration, magnetic force, proximity/electronics geographic fence, radiation, noise, air quality, usages of electricity/water/gas, time/date and/or from all automatic DATA acquisition devices and wherein said DATA is from non-automatic DATA acquisition sensor information are from user for vehicle traffic reporting, news, weather forecast, tsunami alerts, currency exchange, stock/commodity/crypto currency pricing and/or small, simple and/or short messages.

12. The WiFi SSID DATA communication controller ASIC chip in claim 11, wherein said DATA is for user and/or machine (AI) to receive, recognize, read, copy, decode, analyze, process, re-transmit and/or upload if to internet cloud servers.

13. The WiFi SSID DATA communication controller ASIC chip in claim 11, wherein said WiFi SSID transmitter in said controller chip is transmitting said SSID with combined both said IoT sensor/DATA input device identification information plus real-time and/or non-real-time said IoT sensor gathered variable DATA information.

14. The WiFi SSID DATA communication controller ASIC chip in claim 11, wherein said IoT sensor/DATA input device variable DATA information is dynamically changing/updating and/or fixed from said IoT sensors/DATA input device for IoT applications.

15. The WiFi SSID DATA communication controller ASIC chip in claim 11, wherein said controller chip has only a said SSID transmitter built-in without receiver for cost reduction and low-power consumption applications for battery operated IoT users.

\* \* \* \* \*